(12) United States Patent
Kaneko et al.

(10) Patent No.: US 11,769,338 B2
(45) Date of Patent: Sep. 26, 2023

(54) IMAGE PROCESSOR AND IMAGE PROCESSING METHOD

(71) Applicant: Faurecia Clarion Electronics Co., Ltd., Saitama (JP)

(72) Inventors: Takayuki Kaneko, Saitama (JP); Yousuke Haga, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 159 days.

(21) Appl. No.: 17/360,391

(22) Filed: Jun. 28, 2021

(65) Prior Publication Data

US 2021/0402987 A1 Dec. 30, 2021

(30) Foreign Application Priority Data

Jun. 29, 2020 (JP) ................................. 2020-111231

(51) Int. Cl.
*G06V 20/58* (2022.01)
*G06T 7/13* (2017.01)
(Continued)

(52) U.S. Cl.
CPC .......... *G06V 20/586* (2022.01); *B60W 30/06* (2013.01); *G06T 7/13* (2017.01); *G06V 10/421* (2022.01);
(Continued)

(58) Field of Classification Search
CPC .......... B60W 30/06; B62D 15/02; G06T 7/00; G06T 7/13; G06T 2207/30264;
(Continued)

(56) References Cited

U.S. PATENT DOCUMENTS

2009/0010482 A1* 1/2009 Nishida ..................... G06T 7/12
382/100
2009/0207045 A1 8/2009 Jung
(Continued)

FOREIGN PATENT DOCUMENTS

DE 10 2009 008 113 8/2009
DE 10 2015 206 546 10/2015
(Continued)

OTHER PUBLICATIONS

A Robust Method for Detecting Parking Areas in Both Indoorand Outdoor Environments—2018 (Year: 2018).*
(Continued)

*Primary Examiner* — Nizar N Sivji
(74) *Attorney, Agent, or Firm* — Wenderoth, Lind & Ponack, L.L.P.

(57) ABSTRACT

An image processor includes an edge detection portion for scanning an image and detecting, as edges, an arrangement of pixels in which brightness value difference or color parameter difference between the pixels is equal to or greater than a threshold; a grouping portion for grouping the detected edge based on edge length, a distance between endpoints of the edges, and an angle between the edges; a determination portion for determining the grouped edges as a dashed line edge group when a pattern, in which the brightness value difference or the color parameter difference between the pixels is detected, matches a predetermined pattern; a correction portion for performing a linear approximation process on the dashed line edge group to correct a coordinate value of an endpoint of the dashed line edge; and a parking frame setting portion for setting a parking frame using the corrected dashed line edge.

5 Claims, 10 Drawing Sheets

(51) Int. Cl.
*G06V 10/56* (2022.01)
*G06V 20/56* (2022.01)
*B60W 30/06* (2006.01)
*G06V 10/42* (2022.01)
*G06V 10/422* (2022.01)
*G06V 10/44* (2022.01)

(52) U.S. Cl.
CPC ............ *G06V 10/422* (2022.01); *G06V 10/44* (2022.01); *G06V 10/56* (2022.01); *G06V 20/588* (2022.01); *G06T 2207/30264* (2013.01)

(58) Field of Classification Search
CPC ...... G06V 10/443; G06V 10/56; G06V 10/60; G06V 20/588; G06V 10/421; G06V 10/422; G06V 10/44; G06V 20/586
See application file for complete search history.

(56) References Cited

U.S. PATENT DOCUMENTS

| | | | | |
|---|---|---|---|---|
| 2015/0294164 | A1* | 10/2015 | Sakamoto | G06V 20/588 382/104 |
| 2015/0317526 | A1* | 11/2015 | Muramatsu | G06V 20/588 348/148 |
| 2015/0339535 | A1* | 11/2015 | Utagawa | G06T 7/73 348/118 |
| 2018/0204073 | A1* | 7/2018 | Kawano | B60W 30/12 |
| 2018/0307919 | A1* | 10/2018 | Hayakawa | G06T 7/12 |
| 2019/0135341 | A1* | 5/2019 | Kumano | G06V 20/588 |
| 2020/0193175 | A1* | 6/2020 | Okada | G06V 20/586 |
| 2020/0193188 | A1* | 6/2020 | Okada | G06V 10/25 |

FOREIGN PATENT DOCUMENTS

| | | | | |
|---|---|---|---|---|
| EP | 2 927 060 | | 10/2015 | |
| EP | 2960827 | A1 * | 12/2015 | ......... G06K 9/00798 |
| EP | 3 367 336 | | 8/2018 | |
| JP | 3-99952 | | 4/1991 | |
| JP | 2003-118522 | | 4/2003 | |
| JP | 2018-84925 | | 5/2018 | |
| JP | 2018084925 | A * | 5/2018 | |
| WO | WO-2014084118 | A1 * | 6/2014 | ......... G06K 9/00798 |

OTHER PUBLICATIONS

Parking Slot Markings Recognition for Automatic Parking Assist System—2006 (Year: 2006).*
Real-time Parking Slot Detection for Camera-equipped Vehicles—2019 (Year: 2019).*
A Parking-line detection method based on edge direction—2014 (Year: 2014).*
A Real-Time Rear View Camera Based Obstacle Detection—2009 (Year: 2009).*
Extended European Search Report dated Nov. 29, 2021 in corresponding European Patent Application No. 21182146.7.

* cited by examiner (a)

(b)

IMAGE PROCESSOR AND IMAGE PROCESSING METHOD

CROSS-REFERENCE TO RELATED APPLICATION

The present application is based on and claims priority from Japanese patent application No. 2020-111231 filed on Jun. 29, 2020, the disclosure of which is hereby incorporated by reference in its entirety.

FIELD OF THE INVENTION

A present disclosure relates to an image processor and an image processing method that estimate a parking frame on a road surface based on an image signal from an imaging device that captures the road surface around a vehicle.

BACKGROUND

A parking assist device has been used to assist the parking of a vehicle by automatically detecting a target parking space upon parking the vehicle in a predetermined parking space. As a technology to automatically detect the parking space, it is known to detect boundary lines drawn with solid lines and/or dashed lines based on the images around the vehicle captured by the cameras provided in the vehicle and to detect an area defined by the boundary lines as the parking space (see JP2018-84925A, for example).

However, in the above prior art, when relatively short edges are detected due to the light reflection on the road surface, the waste, the stain, or the like, these short edges may be recognized as the edges of the dashed boundary lines, which affects the detection of the parking frame.

Therefore, an object of the present disclosure is to provide an image processor and an image processing method capable of appropriately detecting a parking frame.

SUMMARY

An image processor includes an edge detection portion that is configured to scan in a predetermined direction an image based on an image signal from an imaging device that captures a surrounding around a vehicle and to detect, as an edge, an arrangement of pixels in which brightness value difference or color parameter difference between the pixels adjacent each other is equal to or greater than a threshold value, a grouping portion that is configured to group the detected edge for a predetermined area of the image based on lengths of detected edges, a distance between endpoints of the detected edges, and an angle between the detected edge and another edge, a determination portion that is configured to determine the grouped edges as a group of dashed line edges in a case that a pattern in which the brightness value difference or color parameter difference between the pixels adjacent to each other is detected matches a predetermined pattern as a result of scanning the area including the grouped edges, a correction portion that is configured to perform a linear approximation process on the group of the edges that has been determined as the group of the dashed line edges to correct a coordinate value of an endpoint of an edge of the dashed line edges, and a parking frame setting portion that is configured to set a parking frame by using the dashed line edge whose coordinate value of the endpoint is corrected.

An image processing method includes scanning in a predetermined direction an image based on an image signal from an imaging device that captures a surrounding around a vehicle and detecting, as an edge, an arrangement of pixels in which brightness value difference or color parameter difference between the pixels adjacent each other is equal to or greater than a threshold value, grouping the detected edge for a predetermined area of the image based on lengths of detected edges, a distance between endpoints of the detected edges, and an angle between the detected edge and another edge, determining the grouped edges as a group of dashed line edges in a case that a pattern in which the brightness value difference or color parameter difference between the pixels adjacent to each other is detected matches a predetermined pattern as a result of scanning the area including the grouped edges, performing a linear approximation process on the group of the edges that has been determined as the group of the dashed line edges to correct a coordinate value of an endpoint of an edge of the dashed line edges, and setting a parking frame by using the dashed line edge whose coordinate value of the endpoint is corrected.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
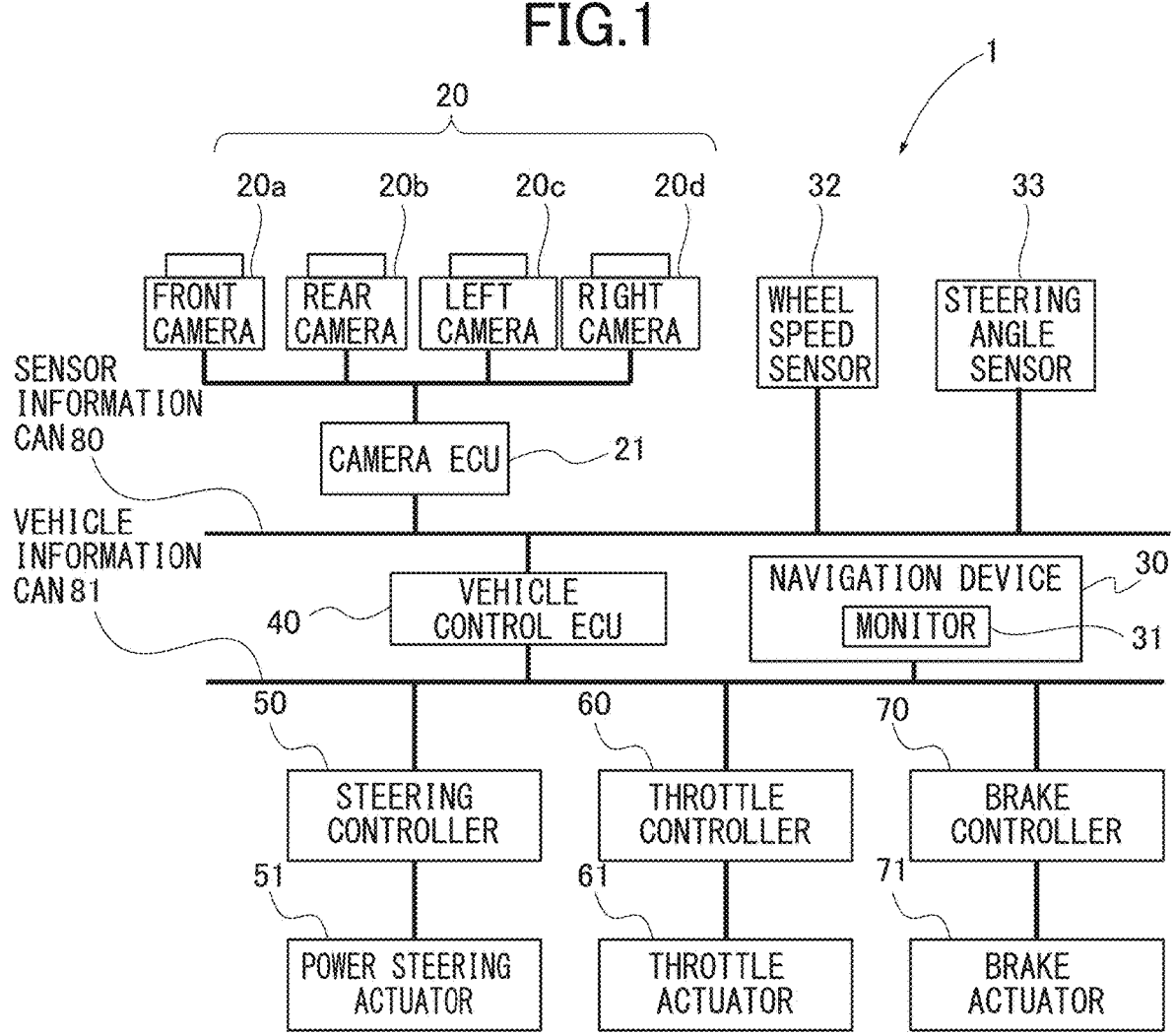
FIG. 1 is a block diagram illustrating a schematic configuration of a parking assist device to which an image processor of an embodiment of the present disclosure is applied.
Figure 2:
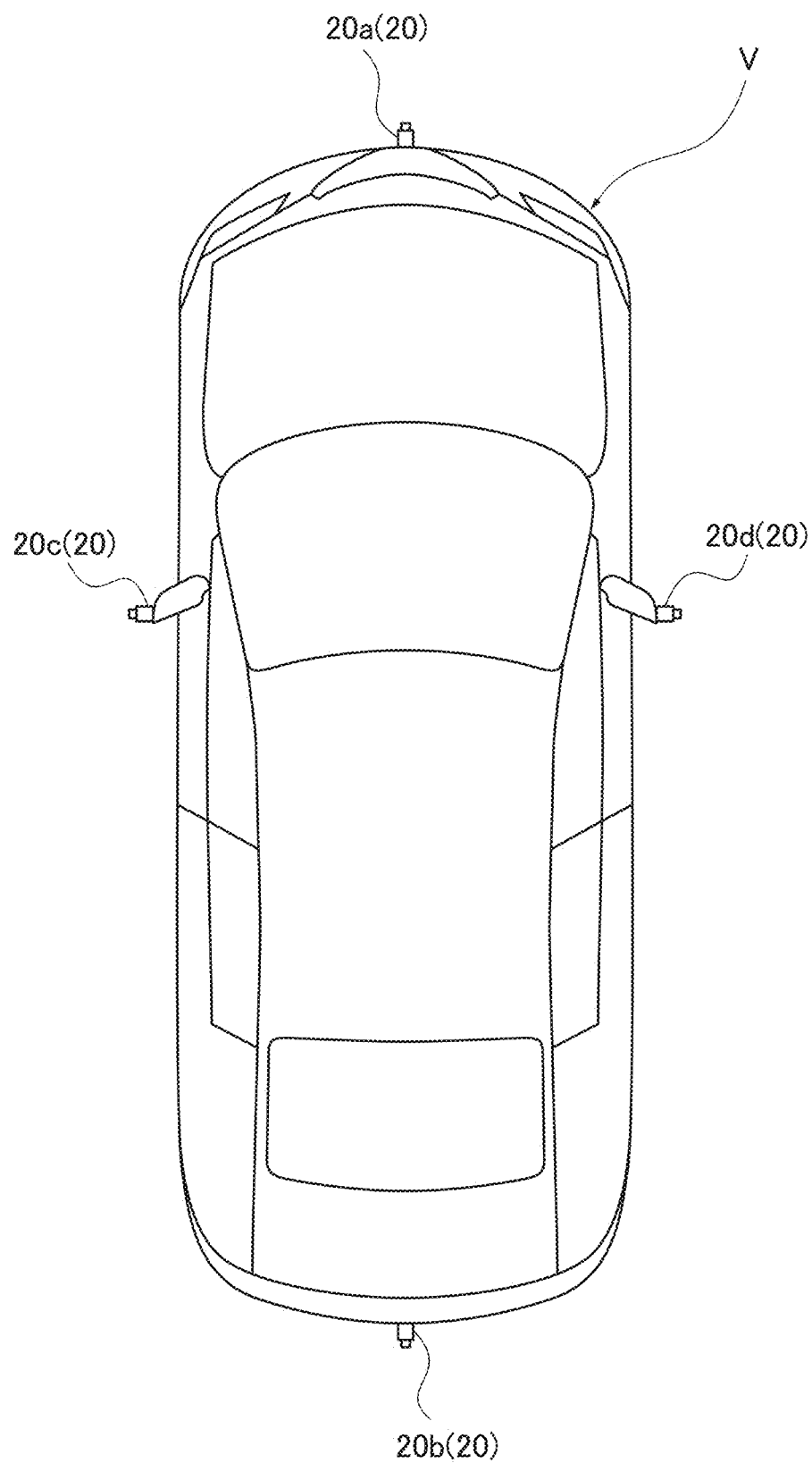
FIG. 2 is a view illustrating an example of positions of imaging devices of the parking assist device of the embodiment.

Hereinafter, embodiments of the present disclosure will be described with reference to the accompanying drawings. FIG. 1 is a block diagram illustrating a schematic configuration of a parking assist device to which an image processor according to an embodiment of the present disclosure is applied. FIG. 2 is a view illustrating an example of positions of imaging devices of the parking assist device. It should be noted that the embodiments of the present disclosure are described with regard to the parking assist device. However, devices to which the image processor of the embodiments of the present disclosure is applied are not limited to the parking assist device. The image processor of the embodiments of the present disclosure may be applied to any devices that use boundary lines and/or parking frames detected by the image processor.

As shown in FIG. 1, a vehicle V (see FIG. 2) is provided with a parking assist device 1 that performs a parking assist operation. More specifically, the parking assist device 1 is configured to recognize a parking frame in which the vehicle V can be parked. The parking assist device 1 controls the vehicle V to be parked in the recognized parking frame.

As shown in FIG. 2, a plurality of small cameras (imaging devices) are mounted on the front, rear, right, and left portions of the vehicle V, respectively.

Specifically, a front camera 20a is mounted on a front bumper or a front grille of the vehicle V to face the forward of the vehicle V. A rear camera 20b is mounted on a rear bumper or a rear garnish of the vehicle V to face the rear of the vehicle V. A left camera 20c is mounted on a left door mirror of the vehicle V to face the left side of the vehicle V. A right camera 20d is mounted on a right door mirror of the vehicle V to face the right side of the vehicle V.

Each of the front camera 20a, the rear camera 20b, the left camera 20c, and the right camera 20d is provided with a wide-angle lens or a fisheye lens for wide range observation. A region including a road surface around the vehicle V can be completely observed by the four cameras 20a to 20d. The cameras 20a to 20d are the imaging devices that capture or image the surroundings around the vehicle V. Hereinafter, the cameras (imaging devices) 20a to 20d are simply referred to as a camera 20 without distinguishing the respective cameras 20a to 20d.

As shown in FIG. 1, the parking assist device 1 includes the front camera 20a, the rear camera 20b, the left camera 20c, the right camera 20d, a camera ECU 21, a navigation device 30, a wheel speed sensor 32, and a steering angle sensor 33.

The camera ECU 21 includes a microcomputer as a main body that includes a Central Processing Unit (CPU), a Read-Only Storage portion (ROM), a Random Access Storage portion (RAM), a flash storage portion, or the like. The camera ECU 21 controls the camera 20. Also, the camera ECU 21 performs, by using information detected by the camera 20, a process for generating an overhead image, a process for detecting a parking frame, and a process for determining whether or not the vehicle V can be parked in the detected parking frame.

The navigation device (or display device) 30 includes a monitor 31 having an image display function. The navigation device 30 includes a storage portion that stores, for example, map data for guiding a route. The navigation device 30 shows a route to a destination set by an operator of the navigation device 30 based on the map data and a present position of the vehicle V detected by a GPS device (not shown), for example. Various images during a route guidance operation are displayed on the monitor 31.

The wheel speed sensor 32 is configured to detect the wheel speed of the vehicle V. The information (wheel speed) detected by the wheel speed sensor 32 is input to a vehicle control ECU 40.

The steering angle sensor 33 is configured to detect a steering angle of the vehicle V. The steering angle sensor 33 outputs a rotation angle from a neutral position (0 degrees) as the steering angle. The steering angle when the vehicle V travels straight is set as the neutral position (0 degrees). The information (steering angle) detected by the steering angle sensor 33 is input to the vehicle control ECU 40.

The parking assist device 1 further includes the vehicle control ECU 40, a steering controller 50, a throttle controller 60, and a brake controller 70.

The vehicle control ECU 40 includes a microcomputer as a main body that includes a Central Processing Unit (CPU), a Read-Only Storage portion (ROM), a Random Access Storage portion (RAM), and a flash storage portion. The vehicle control ECU 40 executes various processes that assist the parking of the vehicle V based on the various information from the camera ECU 21, the wheel speed sensor 32, and the steering angle sensor 33.

More specifically, when a driver starts the parking assist device 1 by turning on an automatic parking start switch or button (not shown), for example, the vehicle control ECU 40 executes an automatic parking operation for automatically parking the vehicle V in a parking frame determined as an available parking frame by the camera ECU 21 or a parking frame determined as an available parking frame by the vehicle control ECU 40 based on the parking frame detected by the camera ECU 21 and the attribute thereof.

The steering controller 50 controls the steering angle of the vehicle V by driving a power steering actuator 51 based on the vehicle control information determined by the vehicle control ECU 40.

The throttle controller 60 controls the throttle of the vehicle V by driving a throttle actuator 61 based on the vehicle control information determined by the vehicle control ECU 40.

The brake controller 70 controls the brake of the vehicle V by driving a brake actuator 71 based on the vehicle control information determined by the vehicle control ECU 40.

The camera ECU 21, the wheel speed sensor 32, the steering angle sensor 33, and the vehicle control ECU 40 are connected by a sensor information Controller Area Network (CAN) (registered trademark) 80 which is an interior Local Area Network (LAN) within the vehicle.

The steering controller 50, the throttle controller 60, the brake controller 70, and the vehicle control ECU 40 are connected by a vehicle information CAN 81 which is the interior LAN within the vehicle.

In the parking assist device 1 having the above configuration, the image processor 100 of the embodiment mainly consists of the camera ECU 21.

Figure 3:
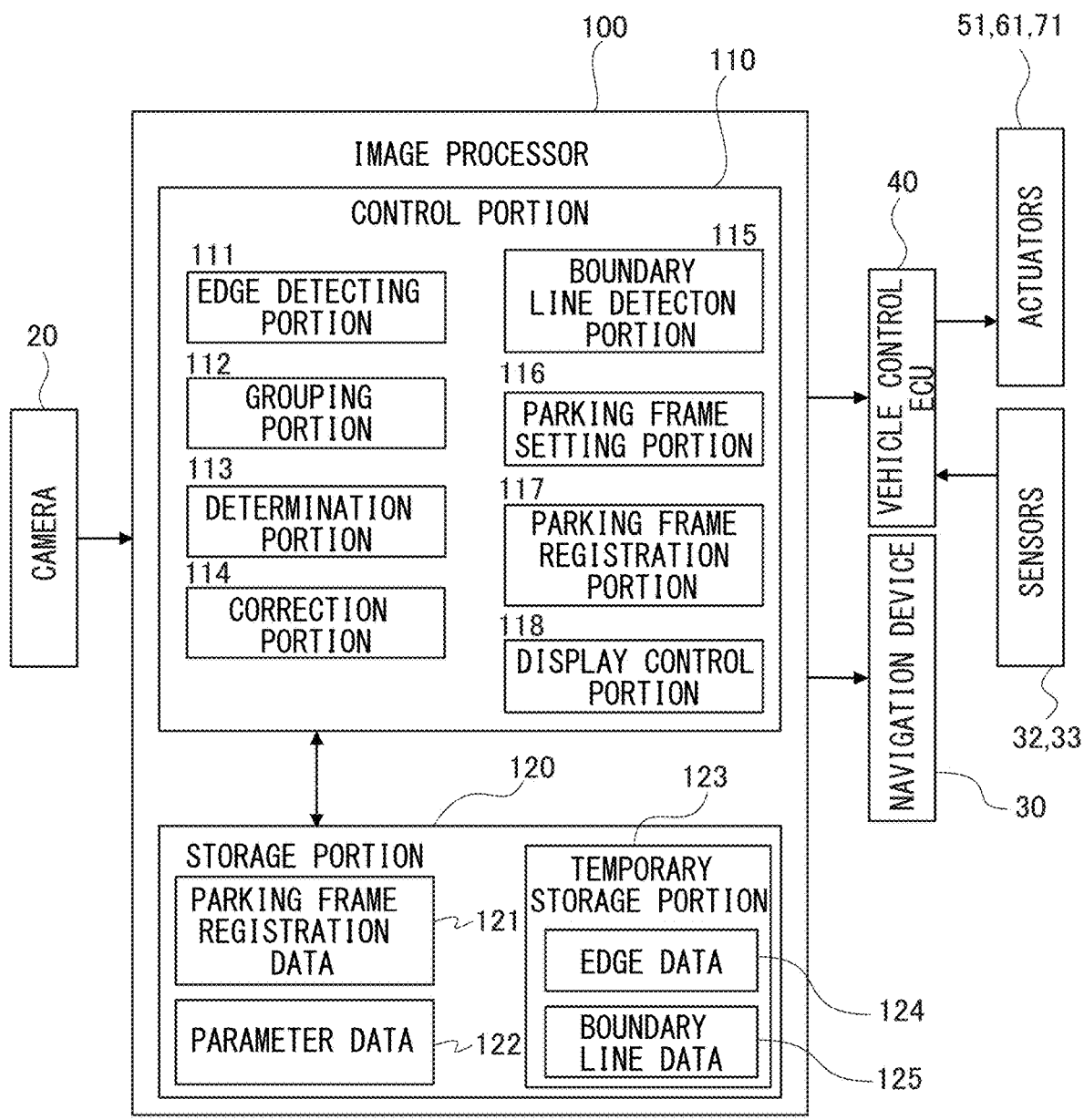
FIG. 3 is a functional block diagram illustrating a schematic configuration of the image processor of the embodiment.

FIG. 3 is a functional block diagram illustrating a schematic configuration of the image processor 100 of the embodiment. The image processor 100 of the embodiment includes a control portion 110 and a storage portion 120.

The control portion 110 mainly consists of the CPU of the camera ECU 21. The control portion 110 includes a calculation element represented by an integrated circuit such as a programmable logic device and an ASIC. The programmable logic device includes a CPU and an FPGA.

The control portion 110 controls the entire image processor 100. Further, the control portion 110 transmits, to the vehicle control ECU 40, information (e.g., positions, shapes, attributes of parking spaces and parking frames) required for the automatic parking operation so that the vehicle control ECU 40 executes the automatic parking operation to automatically park the vehicle V in the parking frame determined as an available parking frame based on the parking space and the boundary lines that define the parking space set by a parking frame setting portion 116.

The vehicle control ECU 40 controls the power steering actuator 51, the throttle actuator 61, and the brake actuator 71 (simply recited as actuators in FIG. 3) based on the information from the control portion 110 and the information detected by the wheel speed sensor 32 and the steering angle sensor 33 (simply recited as sensors in FIG. 3).

The storage portion 120 mainly consists of the ROM, the RAM, the flash storage portion, and the like of the camera ECU 21. The storage portion 120 includes a large-capacity storage medium such as a hard disk drive and/or a storage medium such as a semiconductor storage medium (e.g., ROM, RAM, etc.) The storage portion 120 temporally or non-temporally stores various data, calculation results, and the like which are used for various operations in the control portion 110.

Specifically, the storage portion 120 stores or saves parking frame registration data 121 and parameter data 122. The parking frame registration data 121 relates to the positional data, attributes, and other information of the detected parking frame. The storage portion 120 stores the parking frame registration data 121 for the set parking frame. The positional data is coordinate values of endpoints of the line segments of the positive and negative edges that define the parking frame. The attribute includes flag information that is used to identify whether the line segments of the positive and negative edges that define the parking frame are the line segments of the edges detected from the boundary lines drawn with the solid lines (referred to as "solid line edge" hereinafter) or the line segments of the edges detected from the boundary lines drawn with the dashed lines (referred to as "dashed line edge" hereinafter).

As the parameter data 122, a threshold value of the brightness or color parameter when detecting the edges, a threshold value of the edge length when grouping the edges, a threshold value of the distance between the endpoints of the edges, a threshold value of the angle between the edges, a threshold value of the distance between the extended line set to an edge and the endpoint of another edge, threshold values of the scanning length, the brightness value difference, and the like when determining the dashed line edge, a maximum correction amount of the dashed line edge, a reference boundary line length when detecting the boundary line, a parking space width and threshold value thereof when setting the parking frame, and the like may be stored, for example. Further, various parameters used by the image processor 100 such as the widths of the boundary lines, the extending angles of the boundary lines, and the like may be stored. Also, it is possible to adopt a configuration that stores a plurality of petameters and selects appropriate parameters depending on areas and/or countries where the parking assist device 1 is used, shapes and/or sizes of the parking spaces (and/or parking frames), or the like.

Also, a temporary storage portion 123 of the storage portion 120 temporarily stores edge data 124 and boundary line data 125. The edge data 124 includes the positional information (coordinate values) of start and finish points of the edges (line segments of positive and negative edges) detected by the edge detection and attribute. The attribute includes flag information to identify whether the edge is the solid line edge or the dashed line edge. The edge data 124 is stored in the temporary storage portion 123 for each of the detected edges.

The boundary line data 125 includes the positional information (coordinate values) of the start and finish points of the line segments of positive and negative edges of the boundary lines and the attribute for each of the boundary lines. The attribute includes flag information to identify whether the edges that constitute the detected boundary lines are the solid line edges or the dashed line edges.

The storage portion 120 stores a control program (not shown). This control program is executed by the control portion 110 at the startup of the image processor 100. The image processor 100 includes a functional configuration as illustrated in FIG. 3. In particular, it is preferable for the image processor 100 of the present embodiment to have an arithmetic element capable of calculating at high speed, for example, an FPGA since the image processor 100 executes the high-speed image processing as described below.

As shown in FIG. 3, the control portion 110 includes an edge detection portion 111, a grouping portion 112, the determination portion 113, a correction portion 114, a boundary line detection portion 115, the parking frame setting portion 116, a parking frame registration portion 117, and the display control portion 118.

Figure 5:
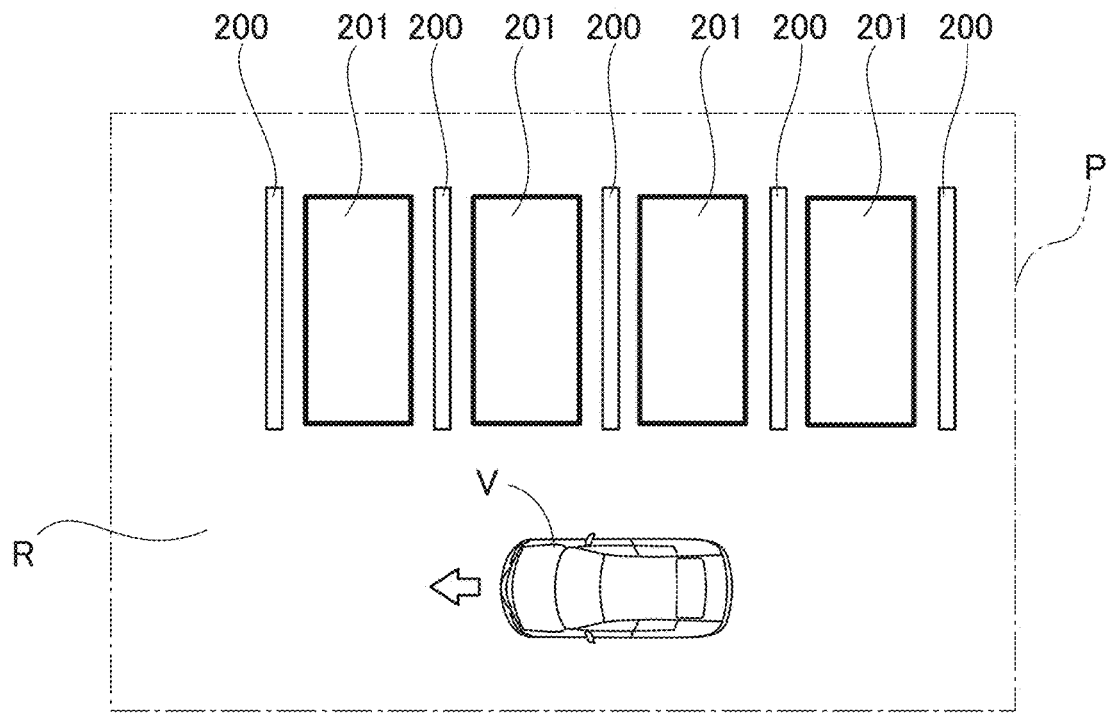
FIG. 5 is a view illustrating an example of the operation of the image processor according to the embodiment and showing a vehicle and boundary lines drawn with solid lines on a road surface of a parking lot.
Figure 6:
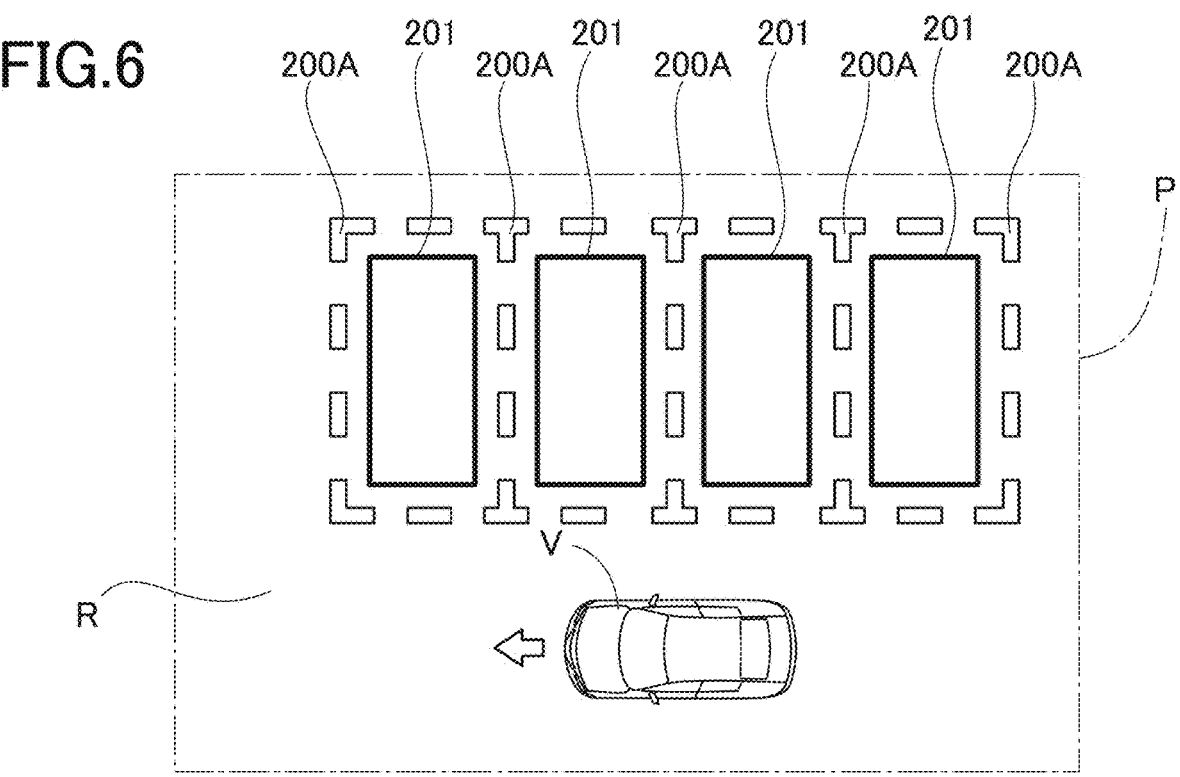
FIG. 6 is a view illustrating an example of the operation of the image processor according to the embodiment and showing the vehicle and boundary lines drawn with dashed lines on the road surface of the parking lot.

The edge detection portion 111 detects the edges of the boundary lines 200, 200A on the road surface R of the parking lot P or the like based on the image signal from the camera 20 that captures the road surface R around the vehicle V. The boundary lines 200, 200A herein are provided or drawn as borderlines (straight lines) that define the parking areas mainly on the road surface R. FIG. 5 illustrates an example of the boundary lines 200 drawn with solid lines (also referred to as solid boundary lines hereinafter) on the road surface R of the parking lot P and the vehicle V to be parked therein. FIG. 6 illustrates an example of the boundary lines 200A drawn with dashed lines (also referred to as dashed boundary lines hereinafter) on the road surface R of the parking lot P and the vehicle V to be parked therein. In FIG. 5, a space between the boundary lines 200 is defined as the parking frame 201 that represents the parking space. Similarly, in FIG. 6, a space between the boundary lines 200A is defined as the parking frame 201 that represents the parking space. In this way, there are the parking lot P that includes the parking spaces defined by the solid boundary lines 200 and the parking lot P that includes the parking spaces defined by the dashed boundary lines 200A. In addition, there are parking lots P that include both the solid boundary lines 200 and the dashed boundary lines 200A on the road surface R, and the parking spaces are defined by the solid boundary lines 200 and the dashed boundary lines 200A, respectively.

Figure 7:
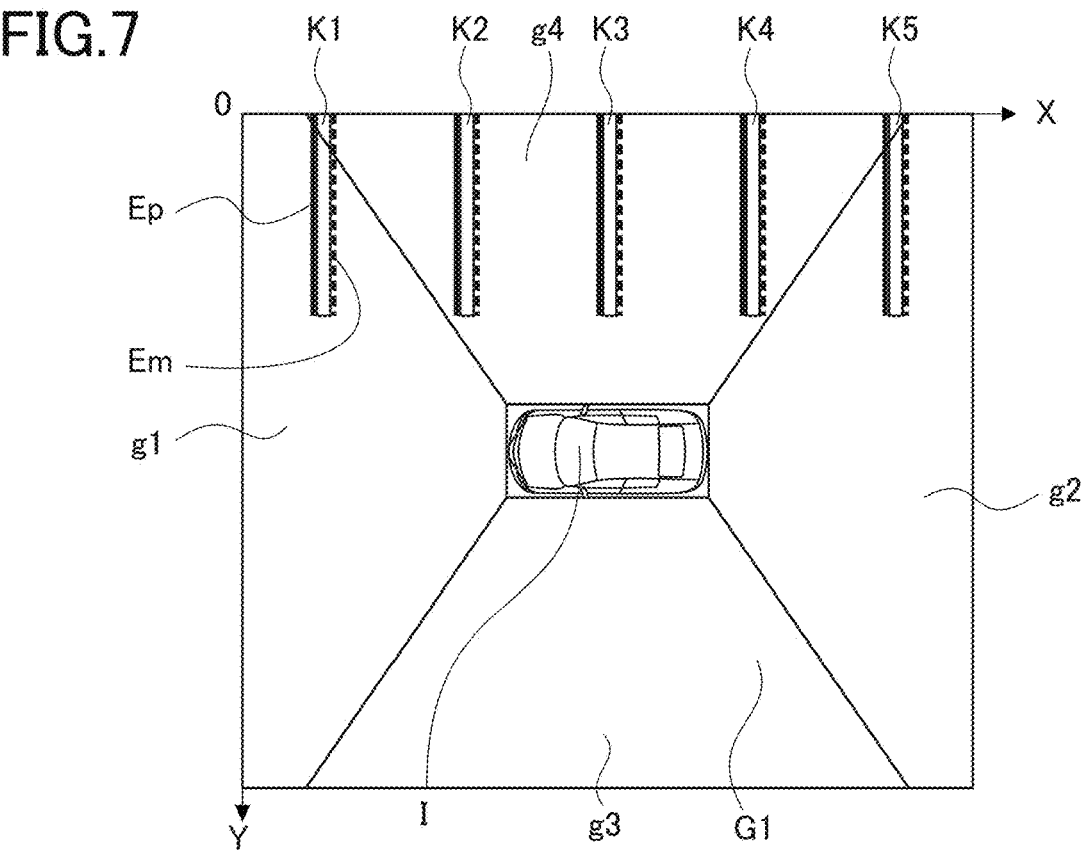
FIG. 7 is a view illustrating an example of the operation of the image processor according to the embodiment and schematically showing edges detected from the overhead image and the boundary lines drawn with solid lines.
Figure 8:
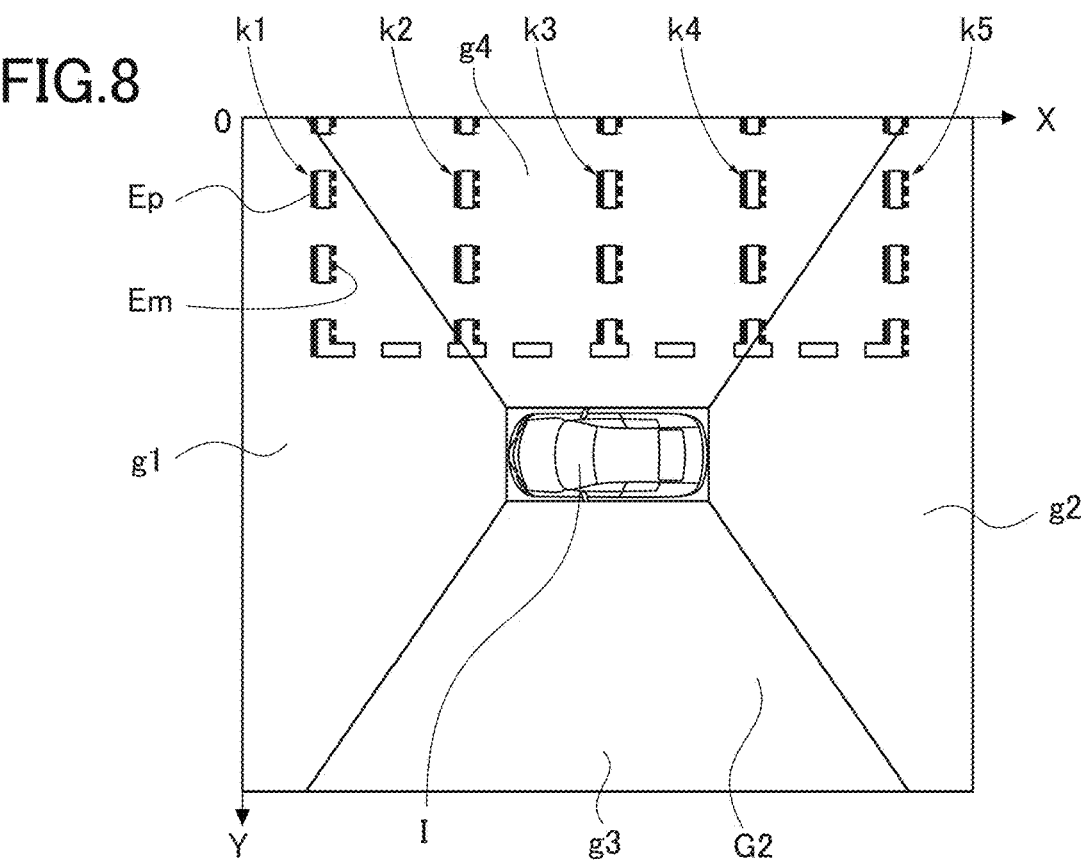
FIG. 8 is a view illustrating an example of the operation of the image processor according to the embodiment and schematically showing dashed line edges detected from the overhead image and the dashed boundary lines.

FIG. 7 schematically illustrates an overhead image G1 generated by synthesizing signals of the images captured by the camera 20 and the detected edges in the parking lot P including the solid boundary lines 200 of FIG. 5. FIG. 8 schematically illustrates an overhead image G2 generated by synthesizing signals of the images captured by the camera 20 and the detected edges in the parking lot P including the dashed boundary lines 200A of FIG. 6. The overhead images G1, G2 shown in FIGS. 7 and 8 are respectively generated by converting the images based on the image signals of the images captured by the cameras 20a to 20d into overhead images g1 to g4, in which the vehicle V is viewed from the just above, and synthesizing the overhead images g1 to g4. An icon I is displayed in the center of the overhead image G1, G2, respectively. The icon I represents the vehicle V viewed from directly above.

The boundary lines 200, 200A are generally in white but may be in other colors such as yellow. Accordingly, the images of the boundary lines 200, 200A detected by the edge detection portion 111 are not limited to the white lines. Generally, borderlines each having a contrast with respect to the road surface R on the image may be detected as the images of the boundary lines 200, 200A. Hereinafter, such borderlines are referred to as the white lines regardless of their colors to simplify explanations.

The edge detection portion 111 scans the image in a predetermined direction. Then, the edge detection portion 111 detects pixels whose brightness values or color parameter data (e.g., RGB, RGBA, etc.) included in the image signal increase larger than a threshold and detects, as an edge, a portion in which the arrangement of the detected pixels has a given length or more. The scanning described herein is meant to select a pixel one by one in the predetermined direction, and compare the brightness values or the color parameters between the adjacent pixels. The detected edge is detected as a positive edge or a negative edge depending on the direction or tendency of change in the brightness values or color parameters.

Preferably, the scanning direction is set to a direction orthogonal to the boundary lines 200, 200A on the road surface R. For example, when the boundary lines 200, 200A extend in the direction intersecting or orthogonal to the traveling direction of the vehicle V (see arrows in FIGS. 5, 6), it is preferable to perform scanning along the traveling direction of the vehicle V on the respective overhead images G1, G2 (see FIGS. 7, 8). On the other hand, when the boundary lines 200, 200A extend in the traveling direction of the vehicle V, it is preferable to perform scanning in the direction intersecting or orthogonal to the traveling direction of the vehicle V on the respective overhead images G1, G2. Generally, the extending directions of the boundary lines 200, 200A may not be known in advance. Accordingly, it is preferable for the edge detection portion 111 to scan twice in both the traveling direction of the vehicle V and the direction intersecting or orthogonal to the traveling direction on the corresponding overhead images G1, G2.

In the case that the edge is extracted based on the brightness values, the edge detection portion 111 detects, as a positive edge (also referred to as rising edge), an edge changing from darker pixels with lower brightness (for example, black pixels) to brighter pixels with higher brightness (for example, white pixels) with the difference larger than a threshold, that is an edge in which difference of the brightness values between the adjacent pixels increases more than a predetermined value in the positive direction. The detection of the positive edge indicates that the scanning position is switched from the image of the road surface R (referred to as "road surface image" hereinafter) to the image that is estimated as the image of the boundary lines 200, 200A (referred to as "boundary line image" hereinafter).

In addition, the edge detection portion 111 detects, as the negative edge (also referred to as falling edge), an edge changing from the brighter pixels with higher brightness to the darker pixels with lower brightness with the difference larger than a threshold, that is an edge in which difference of the brightness values between the adjacent pixels increases more than a predetermined value in the negative direction. The detection of the negative edge indicates that the scanning position is switched from the image that is estimated as the boundary line image to the road surface image.

On the other hand, in the case that the edge is extracted based on the color parameter, the color parameter of the road surface image is compared with the color parameter of the boundary line image. The edge detection portion 111 detects the pixel array in which the value of the color parameter is changed in the increasing direction (in the negative direction) as the negative edge. On the other hand, the edge detection portion 111 detects the pixel array in which the values of the color parameter are changed in the decreasing direction (in the positive direction) as the positive edge. When the brightness value of the boundary line image is lower than that of the road surface image or the color parameter of the boundary line image is larger than that of the road surface image, the change in the brightness value and the color parameter is reversed. In either case, the positive edge and the negative edge are detected on the respective sides of the boundary line image, which makes it possible to extract pairs of edges possible, which is described below.

Figure 9:
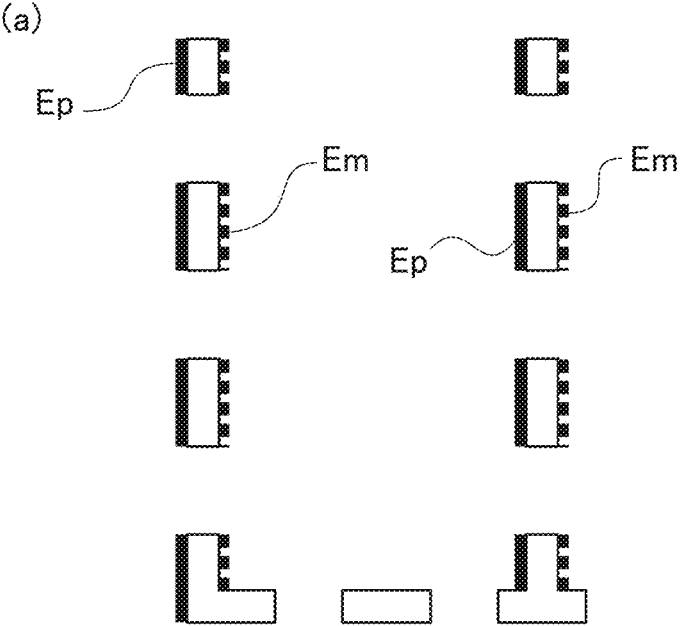
FIG. 9 is a view illustrating an example of the operation of the image processor according to the embodiment: a section (a) is a partially enlarged view of FIG. 8 to schematically illustrate positive and negative edges detected from the dashed boundary lines drawn, and a section (b) schematically illustrates the positive dashed line edges and the negative dashed line edges which are respectively connected by the correction.
Figure 9:
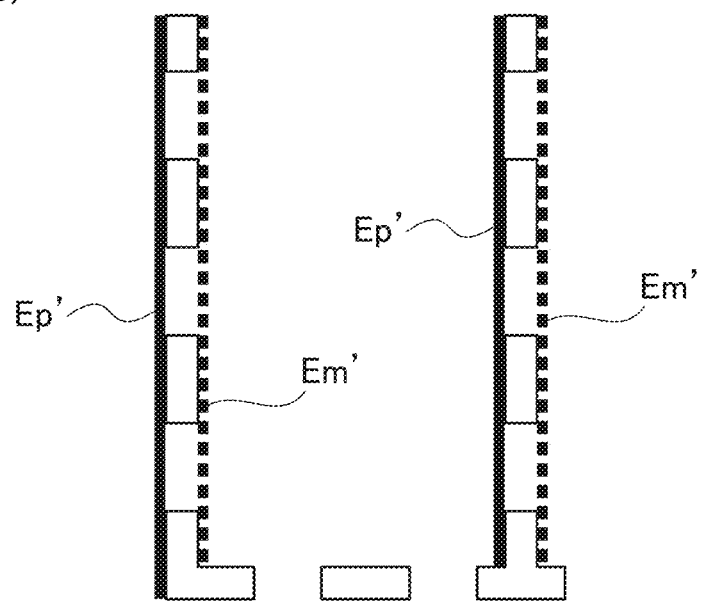

By repeating the above scanning for a plurality of lines, a line segment (pixel array) consisting of the consecutive positive edges in the direction intersecting the scanning direction is extracted as the line segment of the positive edge and a line segment (pixel array) consisting of the consecutive negative edges is extracted as the line segment of the negative edge. FIG. 7 schematically illustrates the solid line edges detected from the solid boundary lines 200 in the overhead image G1. FIG. 8 schematically illustrates the dashed line edges detected from the dashed boundary lines 200A in the overhead image G2. As shown in FIGS. 7 and 8, the thick solid lines represent the positive edges Ep and the thick dashed lines represent the negative edges Em. Also, the section (a) of FIG. 9 is a partially enlarged view of FIG. 8 that schematically illustrates the positive edges Ep and the negative edges Em detected from the dashed boundary line 200A.

In the examples shown in FIGS. 7 and 8, the direction orthogonal to the extending direction of the boundary line images along the traveling direction of the vehicle V on the overhead images G1, G2 (i.e., horizontal direction in FIGS. 7, 8) is represented with an X-axis while the extending direction of the boundary line images (i.e., vertical direction in FIGS. 7, 8) is represented with a Y-axis. The edge detection portion 111 scans the overhead images G1, G2 in the direction orthogonal to the traveling direction of the vehicle V toward the X-axis positive direction (from left to right in the figures) to detect the positive and negative edges. When the overhead image G is scanned from right to left in the figures, that is in the X-axis negative direction, the positive and negative edges are reversed. The positive and negative edges may also be detected in accordance with information of the color parameters (e.g., RGB, RGBA, etc.) included in the image signal. In this case, the positive and negative edges may be detected based on changes in the magnitude (graduation, tone) of given colors. The edge detection portion 111 temporarily stores information of the detected edges as the edge data 124 in the temporary storage portion 123 of the storage portion 120. The value that indicates the solid line edge is set to the flag information as the default value.

In addition to the edges detected from the boundary lines 200, 200A, relatively short edges may be detected from the overhead images G1, G2 due to the reflection of light on the road surface R, dust, stains, parked vehicles, or the like. In the prior art, such short edges are regarded also as the edges that define the dashed boundary lines, which affect the detection accuracy of the parking frame. The short edges caused by the reflection of light or the like may be filtered or removed by the filtering process when extracting the edges that are to be detected as the boundary lines 200, 200A. However, in this case, the edges detected from the dashed boundary lines 200A may also be filtered or removed depending on the filtering conditions.

To this end, by using the grouping portion 112, the determination portion 113 and the correction portion 114, the image processor 100 of the present embodiment extracts only the group of edges that are the dashed line edges, forms one dashed line edge by connecting a plurality of short edges from the extracted dashed line edge group by the straight-line approximation process, and then appropriately corrects coordinate values of the endpoints of this dashed line edge. By using the connected dashed line edge, the image processor 100 removes or cancels the edges affected by the reflection of light or the like and appropriately detects the dashed boundary lines 200A to improve the detection accuracy of the parking frame 201 defined by the dashed boundary lines 200A. The grouping portion 112, the determination portion 113, and the correction portion 114 will be described hereinafter.

The grouping portion 112 groups the edges detected by the edge detection portion 111 based on the length of the edge, distances between the endpoints of the adjacent edges, distances between the extended line set to the edges and the endpoints of another edge, and/or angles between the edges for each of predetermined areas in the overhead image G2.

Figure 10:
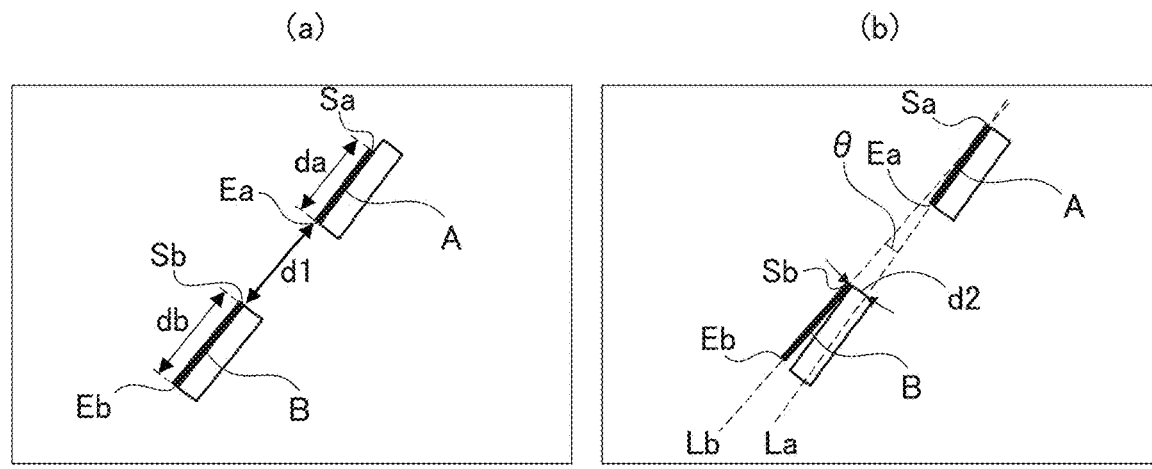
FIG. 10 is a view illustrating an example of the operation of the image processor according to the embodiment: a section (a) illustrates procedures for determining the edge length and a distance between the endpoints of the edges and a section (b) illustrates procedures for determining a distance between an extended line set to one edge and the endpoint of another edge and an angle between the edges.

The grouping process by the grouping portion 112 will be described with reference to FIG. 10. A section (a) of FIG. 10 illustrates the determination procedures for the length of the edge and the distances between the endpoints of the adjacent edges. A section (b) of FIG. 10 illustrates the determination procedures for the distances between the extended lines set to the edge and the endpoints of another edge and the angles therebetween. In FIG. 10, the positive edge which is detected by the edge detection on one side of each white line in the dashed boundary line image is shown with the thick solid line. Also, the negative edge is detected on the other side of the white line. Also, reference signs Sa, Sb, Ea, and Eb shown in FIG. 10 denote the endpoints of the edges. Specifically, the reference signs Sa and Sb denote the start points of the edges while the reference signs Ea and Eb denote the finish points of the edges in accordance with the scanning order.

The grouping portion 112 extracts short edges that may form the dashed line edge from the plurality of edges detected by the edge detection portion 111 for each of the predetermined areas to group the edges. The grouping portion 112 selects a predetermined edge which is a main or reference edge (referred to as "edge A") and compares the main edge A with another edge adjacent to the main edge A in the predetermined area to extract an edge (referred to as "edge B", etc.) that meets conditions (1) to (4), which are described below, to group the predetermined edge (edge A) and the extracted edge (edge B, etc.) into the same group. It is preferable to group the edges by using all conditions (1) to (4). For example, the conditions (1), (2), and (4) may be used to group the edges, which achieves higher arithmetic processing. However, at least one or more of the conditions may be used to group the edges.

(1) The first condition is that the length of the edge falls within a predetermined range. Preferably, the length da of the edge A and the length db of the edge B shown in the section (a) of FIG. 10 fall within a predetermined range from 6 pix to 20 pix (about 18 cm to about 60 cm), for example.

(2) The second condition is that the distance between the endpoints of the edges falls within a predetermined range. Preferably, the distance d1 between the endpoint (e.g., finish point Ea) of the edge A and the endpoint (start point Sb) of the edge B adjacent the edge A shown in the section (a) of FIG. 10 falls within a predetermined range from 10 pix to 23 pix (about 30 cm to about 69 cm), for example.

(3) The third condition is that the extended line set relative to the main edge (first edge) and the endpoint (endpoint closer to the main edge) of another edge (second edge) to be connected is equal to or less than a threshold value. For example, the extended line La is set relative to the main edge A shown in the section (b) of FIG. 10. Preferably, the distance d2 between the set extended line La and the start point Sb of the edge B may be equal to or less than 7 pix (about 21 cm), for example.

(4) The fourth condition is that the angle between the edges (first and second edges) is equal to or less than a threshold value. Preferably, the angle between the extended line La set relative to the main edge A and the extended line Lb set relative to the edge B, which is the comparison target edge, may be equal to or more than 20 degrees, for example as shown in the section (b) of FIG. 10.

It should be noted that the upper and lower limits of the range of the edge length, the upper and lower limits of the distance between the endpoints of the edges, the threshold value for the distance between the extended line set relative to the edge and the endpoint of the other edge, and the threshold value for the angle between the edges are not limited to the values described above. The values may be set in accordance with the length of each white line of the dashed boundary lines 200A, the spacing, distortion of the images, and/or the condition of the image processing for the overhead images or the like. These values are stored to be updatable as the parameter data 122 in the storage portion 120.

The grouping portion 112 performs the grouping process to all of the detected edges. The detected edges may be sorted by the length before the grouping process and the edges longer than a predetermined length (e.g., 70 cm or more) may not be input to the grouping portion 112. Also, extremely short edges may not be input to the grouping portion 112. These processes prevent the solid line edges and the extremely short edges from being included in the loop of the grouping process. This reduces parameters for the grouping process, the determination process and the correction process thereafter so that these processes can be executed faster. As a result, the load of the arithmetic processing can be reduced, and the efficiency of the image processing by the image processor 100 can be improved.

In this case, the threshold value of the predetermined length for grouping or sorting may be stored to be updatable as the parameter data 122 in the storage portion 120. It is preferable that the threshold value of the predetermined length is set to, for example, 70 cm (about 23 pix) considering the minimum length of the solid line edge. However, the threshold value is not limited to the above value and may be set to an appropriate value in accordance with the length of the boundary lines 200, 200A, or the like.

The determination portion 113 scans areas including each of the edge groups grouped by the grouping portion 112. As a result of the scanning, in the case that the detection pattern of the brightness value difference (or color parameter difference) between the adjacent pixels is the same as a predetermined pattern, this edge group is determined as the dashed line edge group.

For example, the predetermined pattern includes a pattern in which first and second areas are detected alternately and repeatedly. The first area is an area where the brightness value difference equal to or more than the threshold value (or the color parameter difference equal to or more than the threshold value) is detected between the adjacent pixels. The second area is an area where the brightness value difference equal to or more than the threshold value (or the color parameter difference equal to or more than the threshold value) is not detected between the adjacent pixels. The first area where the brightness value difference equal to or more than the threshold value (or the color parameter difference equal to or more than the threshold value) is detected is an area including the white line images of the boundary line images. The second area where the brightness value difference equal to or more than the threshold value (or the color parameter difference equal to or more than the threshold value) is not detected is a road surface image between the white line images.

Figure 11:
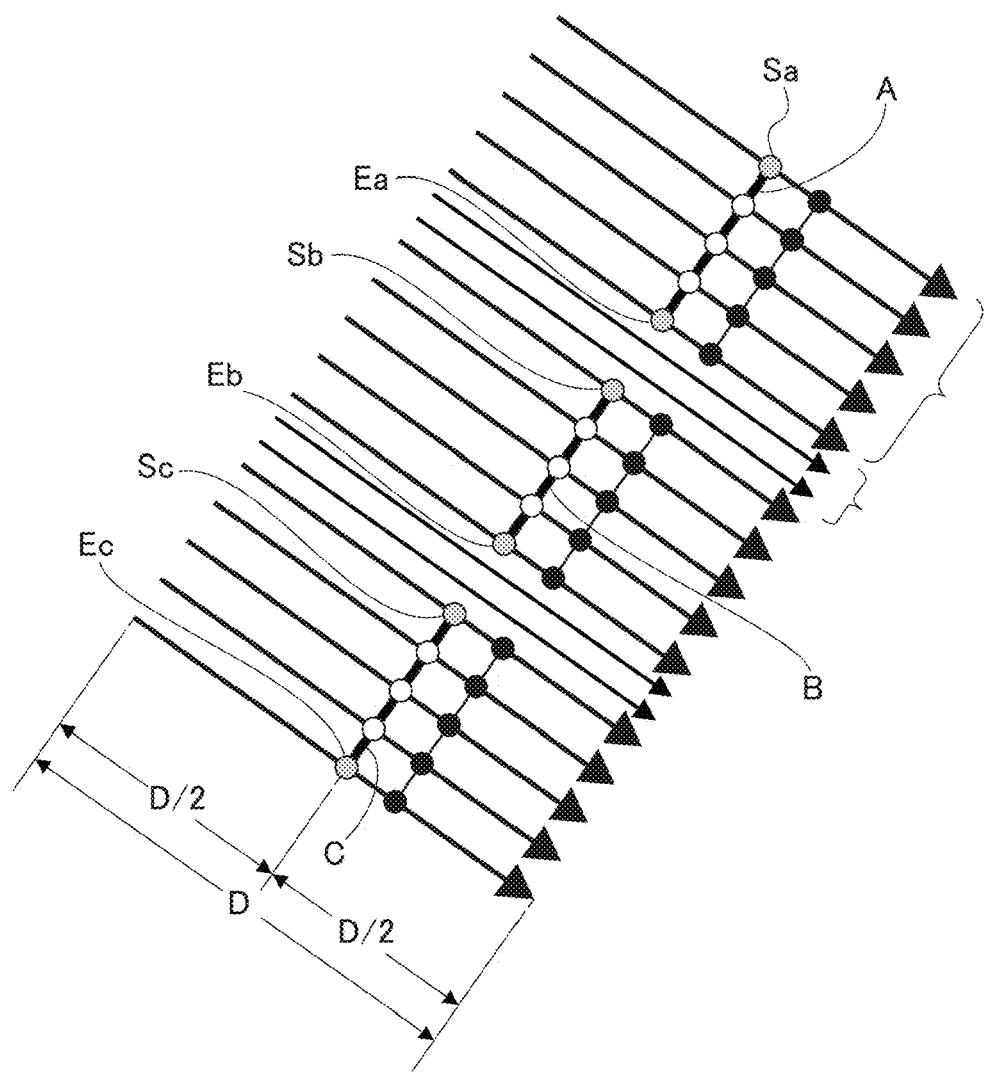
FIG. 11 is a view illustrating an example of the operation of the image processor according to the embodiment to describe a determination procedure by a determination portion.

The determination process by the determination portion 113 will be described with reference to FIG. 11. FIG. 11 illustrates the determination process by the determination portion 113. The determination portion 113 scans predetermined areas on the overhead image G2 based on the brightness values for each edge group (line scanning). At this time, the determination portion 113 scans the predetermined areas through the edges for a predetermined length in a direction orthogonal to a direction in which the edges extend. FIG. 11 shows the scanning lines and the scanning direction with the arrows. The length D of the arrow corresponds to the length of the scanning. A first length from the scanning start point to an edge equals a second length from the edge to the scanning finish point. In other words, the first length and the second length have a length D/2, respectively.

Preferably, the predetermined length D has a length that makes it possible to detect the rising of the brightness in which the scanning position changes from the road surface image to the white line image (i.e., positive edge) and the falling of the brightness in which the scanning position changes from the white line image to the road surface image (i.e., negative edge). In other words, it is preferable that the predetermined length D has a length that makes it possible to detect a state in which the brightness of the adjacent pixels changes more than the threshold value and changes in the order of low, high, and low. Accordingly, it is preferable to set the predetermined length D longer than the width of the boundary line image. Specifically, it is preferable to set the predetermined length D to about 40 cm to about 45 cm (about 13 pix to 15 pix) considering that the width of the boundary lines 200, 200A is about 5 cm to about 35 cm. Alternatively, the predetermined length D may be set to about 25 cm to about 30 cm (about 5 pix to 10 pix) when the width of the boundary lines 200, 200A is about 5 cm to about 20 cm. Scanning for the above length can detect the changes between the road surface image and the white line image with high accuracy when scanning either the positive edge group along one side of the white line image or the negative edge group along the other side of the white line image.

FIG. 11 shows three edges A, B, and C. In the example shown in FIG. 11, the scanning is performed along a plurality of the scanning lines from the scanning line extending through the start point Sa of the edge A to the scanning line extending through the finish point Ec of the edge C by shifting one pixel at a time in the direction the edges extend.

Preferably, the scanning is performed at least along the scanning lines including the start points Sa, Sb, Sc, the scanning lines including the finish points Ea, Eb, Ec of the edges A, B, C and the scanning lines extending through the road surface image between the endpoints. It may not be necessarily to scan the scanning lines of all the pixels shifted by one pixel at a time and the scanning may be performed with an interval of some pixels in the extending direction of the edges A to C.

The threshold value for the brightness value difference when the determination portion 113 scans may be smaller than the threshold value for the brightness value difference when the edge detection portion 111 detects the edges. Also, the angles (directions) may not be compared. Specifically, the threshold value for the brightness value difference may be set to 50, for example.

As shown in FIG. 11, the scanning described above detects, at the respective sides of the white line image, the positive edges (white and gray circles in FIG. 11) in which the brightness changes from the lower pixels to the higher pixels more than the threshold value and the negative edges (black circles in FIG. 11) in which the brightness changes from the higher pixels to the lower pixels more than the threshold value. In FIG. 11, the gray circles represent the start and finish points of the edges A to C. On the other hand, the portion between the endpoints of the white line image is the road surface image, and accordingly, no change in the brightness equal to or more than the threshold value is detected.

In the case that there are two or more scanning lines in which the brightness change more than the threshold value is detected, it is regarded that an area with the detection of the brightness value difference more than the threshold value is detected (i.e., dashed boundary line image is successfully detected). On the other hand, in the case that there are two or more scanning lines in which no brightness change more than the threshold value is detected, it is regarded that an area without the detection of the brightness value difference more than the threshold value is detected (i.e., break of dashed line is successfully detected). Thereby, the pattern determination speed and accuracy are improved.

As a result of the scanning described above, in the case that a pattern including the first area with the detection of the brightness value difference more than the threshold value and the second area without the detection of the brightness value difference more than the threshold value is alternately and repeatedly (e.g., twice or more) detected, the determination portion 113 determines that the edge group is the dashed line edge group (short edge group that constitutes dashed line edge).

On the other hand, in the case that the above pattern is not detected as a result of the scanning, the determination portion 113 determines that the edge group is not the dashed line edge group since this group is a group of the edges other than the edges detected from the dashed boundary lines 200A. Then, the determination portion 113 deletes the edge data 124 of the edges included in the edge group from the temporary storage portion 123 (or sets a value that indicates "deletion" to flag information).

The correction portion 114 performs the linear approximation process on the dashed line edge group determined by the determination portion 113, connects a plurality of short edges to form one dashed line edge, and corrects the coordinate values of the endpoints of the dashed line edge. This correction process is performed for all edge groups that are determined as the dashed line edge groups.

Figure 12:
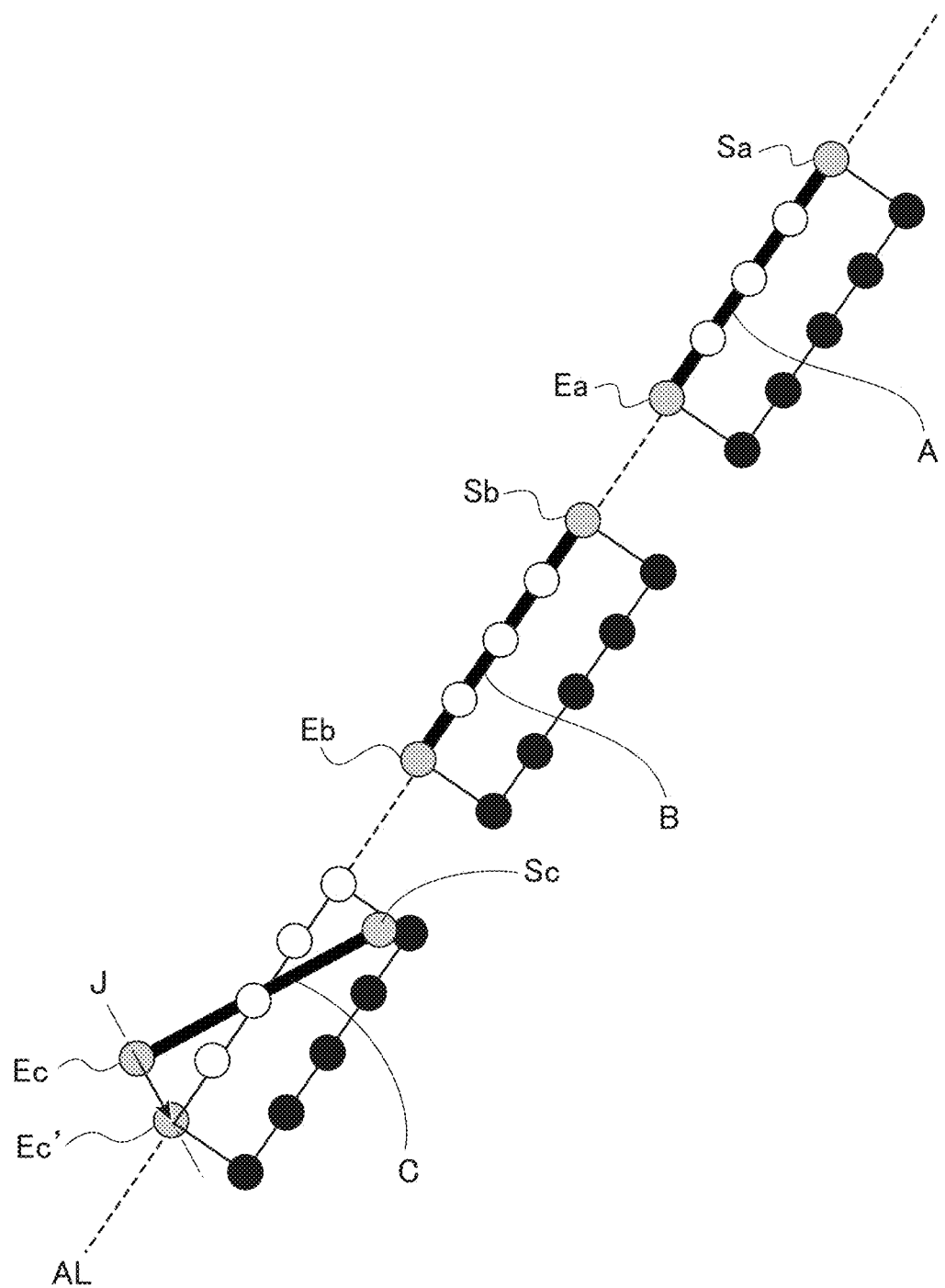
FIG. 12 is a view illustrating an example of the operation of the image processor according to the embodiment to describe a correction procedure by a correction portion.

The correction process by the correction portion 114 will be described with reference to FIG. 12. FIG. 12 illustrates the correction process by the correction portion 114. A dashed line shown in FIG. 12 is an approximate straight line AL calculated based on the coordinate values of the endpoints of the edges A to C, which are the positive edges. The white circles represent the positive edges detected by the scanning of the determination portion 113 while the black circles represent the negative edges. The reference signs Sa, Sb, Sc represent the start points (endpoints) of the edges A to C. The reference signs Ea, Eb, and Ec denote the finish points (endpoints) of the edges A to C. The reference sign Ec' denotes the finish point (endpoint) of the dashed line edge after the correction.

Hereinafter, the correction process for the dashed line positive edge group that is detected at one side of the dashed boundary line image will be described with reference to FIG. 12. It should be noted that this correction process is also applied to the dashed line negative edge group that is detected at the other side of the dashed boundary line image.

The correction portion 114 calculates the approximate straight line AL with regard to the edges A to C included in the edge group based on the coordinate values of the endpoints (i.e., start and finish points) of the edges A to C. At this time, outliers are not acquired and the correction is invalidated to ensure accuracy if the correction amount becomes too large.

Next, the correction portion 114 corrects the coordinate values of the start point Sa of the edge A and the finish points Ec of the edge C, which become the start point and end point of the dashed line edge, to form one dashed line edge by connecting the edges A to C based on the approximate straight line AL. Accordingly, the correction portion 114 obtains intersection points between the approximate straight line AL and the straight lines that extend through the endpoints and intersect the straight lines (edges A, C) before the correction and corrects the coordinate values if the maximum correction amount falls within a predetermined range.

In the example shown in FIG. 12, the coordinate value of the start point of the dashed line edge is set to the coordinate value of the start point Sa of the edge A without the correction by the correction portion 114. With regard to the finish point of the dashed line edge, on the other hand, the correction portion 114 calculates the intersection point between the approximate straight line AL and the straight line J, which is orthogonal to the straight line (edge C) before the correction and extends through the finish point Ec. Then, the correction portion 114 sets this intersection point as the finish point Ec' of the dashed line edge and sets the coordinate value of the intersection point as the coordinate value of the finish point Ec'.

Preferably, the maximum correction amount with respect to the approximate straight line AL when connecting the edges A, B, and C may be 5 pix or about 5 pix, for example. The maximum correction amount includes a squared value as the distance between the pixels in a register or the like. This value may be stored to be updatable as the parameter data 122 in the storage portion 120 if necessary.

The correction portion 114 rewrites the edge data 124 of the dashed line edge group into the coordinate values of the endpoints of the dashed line edge after the correction (after the connection) and the flag information and stores them in the temporary storage portion 123. The correction portion 114 sets the coordinate values of the start and finish points of the dashed line edges to the coordinate values of the endpoints and a value indicating the dashed line edge to the flag information.

A section (b) of FIG. 9 schematically illustrates connected dashed line positive edges Ep' and connected dashed line negative edges Em'. The correction portion 114 connects the positive edges Ep shown in a section (a) of FIG. 9 to form the single dashed line positive edge Ep' and connects the negative edges Em shown in the section (a) of FIG. 9 to form the single line negative edge Em'.

The boundary line detection portion 115 detects the boundary line images from the overhead image by using the edge data 124 of the solid line edges and the connected dashed line edges stored in the temporary storage portion 123. More specifically, the boundary line detection portion 115 extracts, from the edge data 124, the segment lines of the positive and negative edges that extend in a predetermined direction (angle) and have a length equal to or more than the predetermined reference length.

For example, the reference length may be set to a length equal to the vehicle length of the vehicle V (e.g., 5 m). However, the reference length may be set to a length shorter than the vehicle length depending on the imaging range of the camera 20, the shape of the parking frame, or the like. The angle is set by considering the traveling direction of the vehicle V, the orientation of the camera 20 that captures the images, or the like. In the examples shown in FIGS. 5 and 6, the angle is set to 90 degrees±a permissible error since the boundary lines are straight lines that extend substantially orthogonal to the traveling direction.

Then, the boundary line detection portion 115 acquires the positions (coordinate values) of the start and finish points of the extracted line segments of the positive and negative edges. Based on these positions (coordinate values), the boundary line detection portion 115 extracts the line segments of the positive and negative edges adjacent to each other at predetermined intervals to determine a pair of edges that constitute the boundary line. For example, when the distance between the positive edge and the negative edge falls within the boundary line width±a permissible error, the boundary line detection portion 115 determines these edges as a pair of edges. On the other hand, the boundary line detection portion 115 cancels (deletes from temporary storage portion 123) the edges shorter than the reference length, the line segments of the edges extending in directions other than the orthogonal direction, and/or the line segments of the edges that cannot be paired.

At this time, the boundary line detection portion 115 pairs the solid line positive edge and the solid line negative edge and pairs the dashed line positive edge and the dashed line negative edge. However, the boundary line detection portion 115 does not pair the solid line edge and the dashed line edge. The flag information is used to identify whether the edge is the solid line edge or the dashed line edge. In this way, managing the edge attributes with the flag can suppress the paring of the solid line edges and the dashed line edges when detecting the boundary lines. In the overhead image G1 shown in FIG. 7, the pairs of the solid line edges that constitute the solid boundary line images K (K1 to K5) are detected. In the overhead image G2 shown in FIG. 8, the pairs of the dashed line edge that constitute the dashed boundary line images k (k1 to k5) are detected.

The boundary line detection portion 115 stores the coordinate value information of the start and finish points of the line segments of the detected pairs of the positive and negative edges and the flag information as the boundary line data 125 in the temporary storage portion 123. To this flag information, the flag information (solid line edge, dashed line edge) of the edges is transferred and the value indicating the solid line edge or the value indicating the dashed line edge is set.

The parking frame setting portion 116 detects the parking frames (parking spaces) on the overhead images G1, G2 based on the edge pairs that constitute the boundary lines detected by the boundary line detection portion 115. First, the parking frame setting portion 116 selects two line segments of the positive and negative edges that face each other and may define a parking space from the pairs of the line segments of the positive and negative edges. The two line segments to be selected are the line segments of the edges that constitute the respective sides of a pair of boundary line images that define the parking space. Hereinafter, the selected segment lines of the positive and negative edges are referred to as "candidate pair".

In the present embodiment, the parking frame setting portion 116 selects the line segment of the solid line positive edge and the line segment of the solid line negative edge as the candidate pair and selects the line segment of the dashed line positive edge and the line segment of the dashed line negative edge as the candidate pair. Further, the line segment of the solid line positive edge and the line segment of the dashed line negative edge and/or the line segment of the dashed line positive edge and the line segment of the solid line negative edge may be selected as the candidate pairs. Thereby, the parking frame setting portion 116 can set the parking frames in the parking space defined by the solid boundary lines, the parking space defined by the dashed boundary lines, and the parking space defined by the solid and dashed boundary lines, respectively.

Generally, the parking lot P includes the parking frames 201 defined only by the solid boundary lines 200 as shown in FIG. 5 and the parking frames 201 defined only by the dashed boundary lines 200A as shown in FIG. 6. Accordingly, in another embodiment, the combination of the line segments of the solid line edges and/or the combination of the line segments of the dashed line edges may be selected as the candidate pairs while the combination of the line segment of the solid line edge and the line segment of the dashed line edge may not be selected as the candidate pairs. Thereby, it is possible to detect the parking frames according to the actual parking lots P and to improve the processing speed and processing efficiency of the parking frame setting portion 116.

Also, even in the parking lot P including both of the solid boundary lines and the dashed boundary lines, the combination of the line segments of the solid and dashed line edges may not be selected as the candidate pairs. Thereby, the parking frame is not set at the space defined by the solid boundary line 200 and the dashed boundary line 200A. The users, the drivers, or the like can select whether to set the combination of the line segment of the solid line edge and the line segment of the dashed line edge as the candidate pair or not depending on the state of the parking lot P to which the image processor 100 of the present embodiment is applied, the purpose of parking, and the like.

Then, the parking frame setting portion 116 calculates the distance (i.e., inner dimension of adjacent boundary lines) between the two line segments of the edges of the selected candidate pair based on the coordinate values of the endpoints of the edges. It determines whether the calculated distance falls within the predetermined range (e.g., range within parking space width±permissible error). In the case that the distance falls within the predetermined range, the area defined by two line segments of the edges is determined as the parking space and the parking frame is set in that area. The width of the parking space for the regular or middle-sized vehicle or small cargo vehicle is preferably 2 m to 3 m while the width of the parking space for the large truck, the bus, or the like is preferably 3.3 m or more. In the case that the parking frame is for orthogonal parking or a special-purpose vehicle, the parking frame setting portion 116 performs the determination by using the numerical range suitable for such parking frames.

The parking frame registration portion 117 registers the flag information in accordance with the attribute and the positional information of the parking frame 201 set by the parking frame setting portion 116 as the parking frame registration data 121 in the storage portion 120.

The parking frame registration portion 117 sets the coordinate values of the endpoints of the line segments of the positive and negative edges that face each other to constitute the parking frame 201 to the positional information of the parking frame registration data 121. At this time, the parking frame registration portion 117 sets the coordinate values of at least two endpoints (start points) closer to the vehicle V so that the parking frame 201 can be identified while reducing the storage capacity as much as possible. Alternatively, the coordinate values of the four points (i.e., start and finish points) may be set to identify the parking frame 201 more accurately though more memory capacity is required.

The parking frame registration portion 117 sets, to the flag information of the parking frame registration data 121, a value that indicates whether the line segments of the positive and negative edges that face each other are the solid line edges or the dashed line edges.

With this flag information, the attributes of the set parking frame 201 can be recognized. The attributes include the parking frame 201 defined by the solid boundary lines 200, the parking frame 201 defined by the dashed boundary lines 200A, the parking frame 201 defined by the solid boundary line 200 and the dashed boundary line 200A, and the like.

Further, the parking frame registration portion 117 may store, in the storage portion 120, the angles of the boundary lines 200, 200A (extending directions) and/or other information necessary for the automatic parking operation in addition to the parking frame registration data 121.

Also, the parking frame registration portion 117 may determine whether it is possible to park the vehicle V in the set parking frame 201 or not and decide whether to store the set parking frame 201 in the storage portion 120 depending on the determination result. For example, in the case that a vehicle other than the subject vehicle is parked or an obstacle exists in the detected parking space, the parking frame registration portion 117 determines that the detected parking space is not available and does not register the flag information in accordance with the attribution and the positional information of the parking frame 201 as the parking frame registration data 121 in the storage portion 120. Also, the parking frame registration portion 117 may determine that a parking frame closer to the vehicle V or a parking frame to which the vehicle V can be parked easier as an available parking frame and resister the flag information in accordance with the attribution and the positional information of the parking frame 201 as the parking frame registration data 121 in the storage portion 120.

The parking frame registration data 121 stored in the storage portion 120 by the parking frame registration portion 117 is transmitted to the vehicle control ECU 40 to be used for the parking assist operation. The vehicle control ECU 40 identifies or recognizes whether the parking frame 201 is the parking frame 201 defined by the solid boundary lines 200, the parking frame 201 defined by the dashed boundary lines 200A, or the parking frame 201 defined by the solid boundary line 200 and the dashed boundary line 200A by referring to the flag information. As a result, the vehicle control ECU 40 can also select the parking frame 201 used for the parking assist operation depending on the purpose of parking and the like.

The display control portion 118 transmits the display control signal for displaying images on the monitor 31 to the navigation device 30 to control the monitor 31. Specifically, the display control portion 118 transmits a display control signal for displaying on the monitor 31 the images of the road surface around the vehicle V captured by the camera 20 or the overhead image G1, G2 generated by synthesizing these images. Also, the display control portion 118 may transmit the display control signal for displaying on the monitor 31 the image representing the parking frame 201 set by the parking frame setting portion 116 either by superimposing it on the road surface image and/or the overhead images G1, G2 or for displaying it alone. Also, the display control portion 118 may transmit the display control signal for displaying the attribute of the parking frame 201 (parking frame defined by solid or dashed lines) in accordance with the flag information set by the parking frame registration portion 117 by superimposing it on the road surface image and/or the overhead images G1, G2 or for displaying it alone.

An example of the operation of the image processor 100 according to the present embodiment will be described with reference to the flowcharts shown in FIGS. 4A and 4B.

Figure 4A:
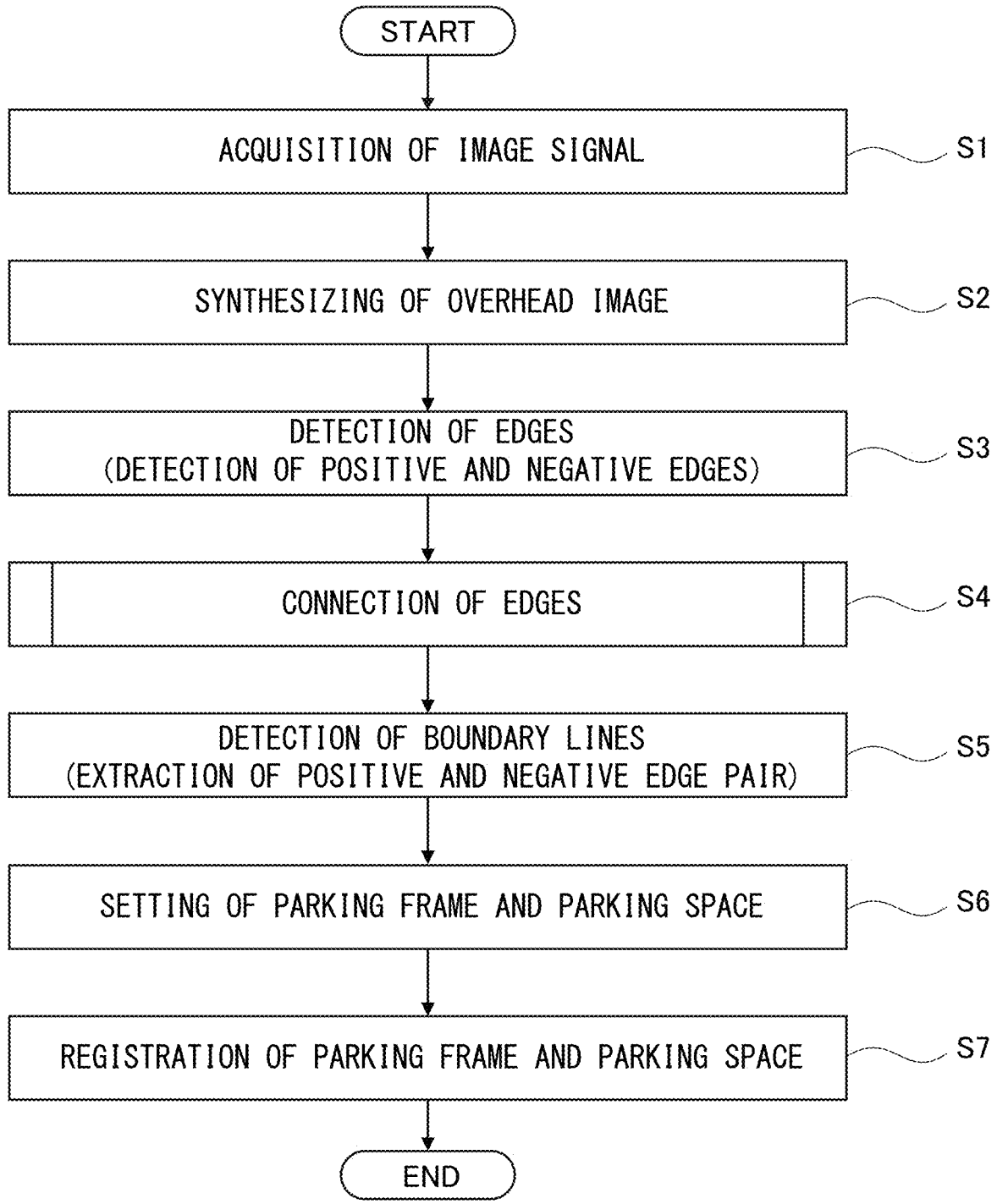
FIG. 4A is a flowchart describing an example of an operation of the image processor.

FIG. 4A shows the flowchart to explain the operation of the image processor 100. FIG. 4B shows the flowchart to explain the edge connection process by the grouping portion 112, the determination portion 113, and the correction portion 114. The operations in the flowcharts shown in FIGS. 4A and 4B start when the driver inputs the automatic parking start instruction by pressing or touching the automatic parking start switch or button (not shown).

In Step S1 shown in FIG. 4A, the control portion 110 of the image processor 100 acquires the signals of the images around the vehicle V captured by the camera 20.

In Step S2, the control portion 110 generates a signal by synthesizing the image signals acquired in Step S1. The display control portion 118 transmits the generated signal to the navigation device 30. The signal generated in Step S2 is the signal for displaying, on the navigation device 30, an image as if a camera were installed above the vehicle V and looked down directly below (see overhead image G1, G2 in FIGS. 7, 8). The generation of the overhead image is known in the prior art as disclosed in JPH03-99952A and JP2003-118522A, for example.

The signal synthesis process for displaying the overhead image may not be performed in Step S2 or the signal synthesis process of Step S2 may be performed after the extraction of the positive and negative edges in Step S3. However, the extraction of the positive and negative edges after the signal synthesis process can reduce the processing load of the image processor 100.

In Step S3 (edge detection step), as described above, the edge detection portion 111 scans the overhead image generated in Step S2 in a predetermined direction and extracts the positive and negative edges in the image based on the brightness values in the image signal (see FIGS. 7, 8).

Then, the program proceeds to Step S4 (edge connection step). The edge connection step will be described with reference to the flowchart shown in FIG. 4B.

Figure 4B:
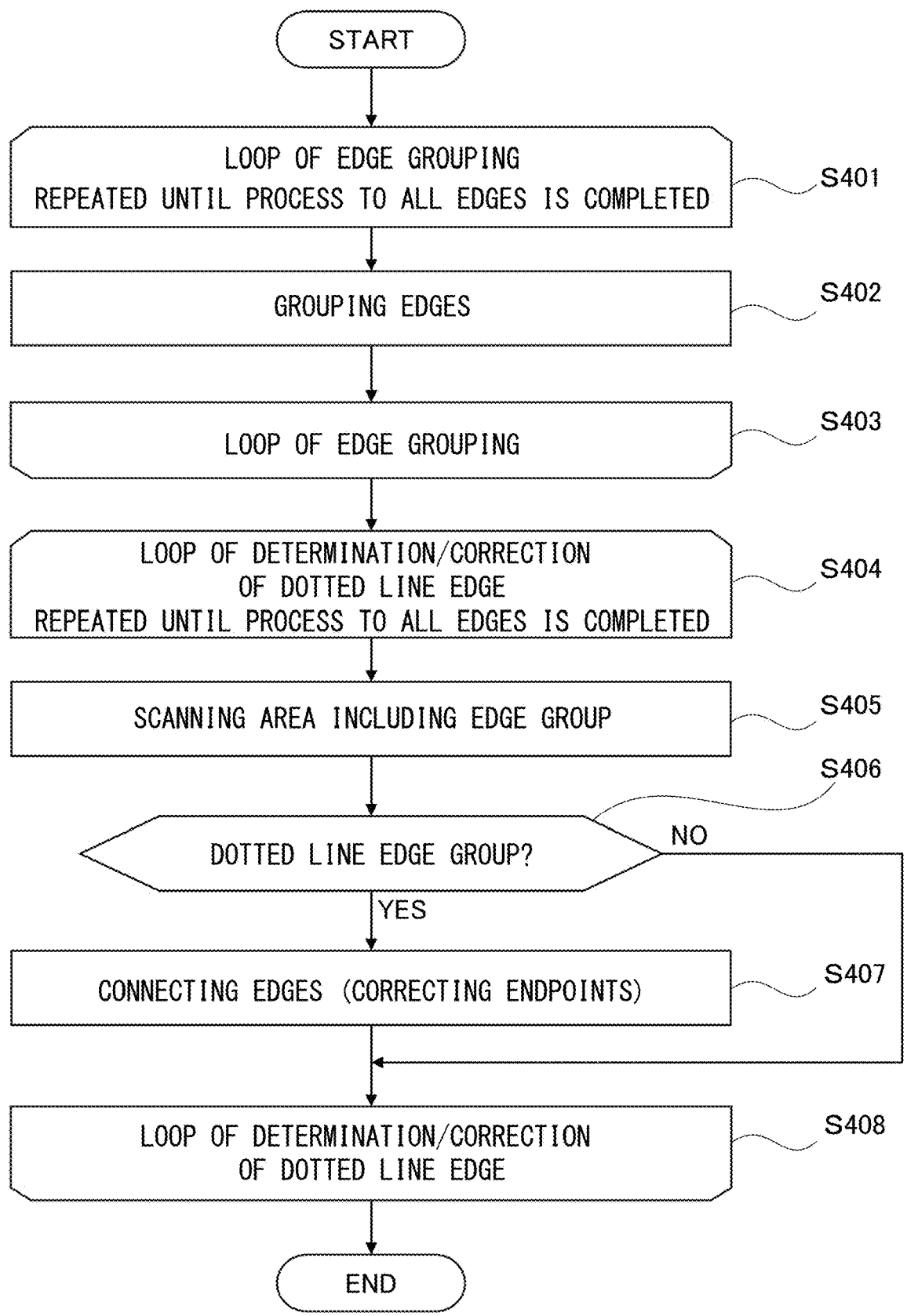
FIG. 4B is a flowchart describing an edge connection process.

In the edge connection step, as shown in FIG. 4B, the loop of the edge grouping steps in Steps S401 to S403 is performed. Steps S401 to S403 are repeated until the processes to all of the edges detected in the edge determination step are completed.

In Step S402 (grouping step), the grouping portion 112 selects a predetermined main (reference) edge from a plurality of edges by the above-described procedures, extracts the main edge that meets the above-described condition (1), and the comparison target edge that meets the above-described conditions (1) to (4) with respect to the main edge, and groups these edges in the same group.

Next, in Step S403, it is determined whether there is another edge to be processed next or not. In the case that there is another edge to be processed, the program returns to Step S401 and the grouping step is performed to the next edge. In the case that there is no edge to be processed next, the loop is terminated and the program proceeds to Step S404.

After the grouping of the edges, the determination/correction looping steps of the dashed line edges in Steps S405 to S408 are performed. The processes in Steps S405 to S408 are repeated until the processes to all of the edge groups grouped in the grouping step are completed.

In Step S405 (determination step I), the determination portion 113 scans areas including the edge groups grouped by the grouping portion 112 with the procedure described above. Then, in Step S406 (defemination step II), the determination portion 113 determines whether or not the edges group is the dashed line edge group based on the scanning result. In the case that the pattern in which the brightness value difference between the pixels adjacent to each other is detected matches the predetermined pattern, the determination portion 113 determines that this edge group is the dashed line edge group. On the other hand, in the case that the predetermined pattern is not detected, the determination portion 113 determines that this edge group is not the dashed line edge group.

In the case that the determination portion 113 determines the edge group is the dashed line edge group (i.e., YES) in Step S406, the program proceeds to Step S407. On the other hand, in the case that the determination portion 113 determines the edge group is not the dashed line edge group (i.e., NO), the program skips S407 and proceeds to Step S408.

In Step S407 (correction step), the correction portion 114 performs a linear approximation process on the dashed line edge group and corrects the coordinate values of the endpoints by the above-described procedures. Accordingly, a plurality of edges are connected to form one dashed line edge. Then, the program proceeds to Step S408.

In Step S408, it is determined whether there is another edge group to be processed next. In the case that there is another edge group to be processed next, the program returns to Step S404 and the determination and correction processes are performed to the next edge group. In the case that there is no edge group to be processed next, the program gets out of the loop and the edge connection process in Step S4 is terminated.

After Step S4, the program proceeds to Step S5 shown in FIG. 4A. In Step S5 (boundary line detecting step), the boundary line detection portion 115 detects the boundary lines (boundary line images) based on the solid line edge detected by the edge detection portion 111 and the dashed line edge connected by the correction portion 114 by the above-described procedures.

Next, in Step S6 (parking frame setting step), the parking frame setting portion 116 sets the parking frame between the boundary lines by the above-described procedures based on the boundary lines detected by the boundary line detection portion 115.

Then, in Step S7 (parking frame registration step), the parking frame registration portion 117 registers the coordinate values of the endpoints of the line segments of the positive and negative edges that face each other and constitute the parking frame set in Step S6, the flag information corresponding to the attribute of the line segments of the edges (solid line edge or dashed line edge), and other information as the parking frame registration data 121 in the storage portion 120. The parking frame registration portion 117 may store all of the detected parking frame registration data 121 or store only the parking frame registration data 121 suitable for the parking in the storage portion 120.

Then, the operation of the image processor 100 is terminated. The parking frame registration data 121 detected by the image processor 100 is transmitted to the vehicle control ECU 40 and the various processes to assist the parking of the vehicle V are performed.

According to the present embodiment, in the edge determination step, the edge detection portion 111 scans the image based on the image signal output from the imaging device that captures the surroundings around the vehicle V in the predetermined direction and detects, as the edge, the arrangement of the pixels in which the brightness value difference or color parameter difference between the adjacent pixels is equal to or greater than the threshold value. In the grouping step, the grouping portion 112 groups the detected edges for each predetermined areas of the image (overhead images G1, G2) by using the edge length (da, db), the distance between the endpoints (Ea, Sb) of the edges and the angle (θ) between the edges. In the determination step, the determination portion 113 determines that the edge group is the dashed line edge group in the case that the pattern in which the brightness value difference or color parameter difference between the adjacent pixels is detected matches the predetermined pattern as the result of scanning the area including the grouped edges. Next, in the correction step, the correction portion 114 performs the linear approximation process on the edge group that has been determined as the dashed line edge group to correct the coordinate values of the endpoints of the dashed line edges. Then, the parking frame setting portion 116 sets the parking frame by using the corrected dashed line edges in the parking frame setting step.

Thereby, the relatively short edges due to the light reflection are canceled or removed and the dashed boundary lines are detected with high accuracy. Accordingly, the parking frame defined by the dashed boundary lines can be set with high accuracy. Therefore, the image processor 100 and the image processing method that are capable of appropriately detecting the parking frame can be provided. In addition, using the image processor 100 and the image processing method of the present disclosure, the parking assist device and the parking assist method can perform the parking assist operation more appropriately.

In addition, in the present disclosure, the grouping portion 112 sets the extended line (La) relative to the detected edge and groups the edges by using the distance between the set extended line and the endpoint (Sb) of another edge (or second edge). Thereby, the other edge (or second edge) to be connected to the detected edge can be detected with high accuracy.

Moreover, in the present disclosure, the determination portion 113 is configured to determine that the edge group is the dashed line edge group when detecting the pattern in which the first area and the second area are detected alternately and repeatedly. The first area is the area where the brightness value difference equal to or more than the threshold value or the color parameter difference equal to or more than the threshold value is detected between the adjacent pixels. The second area is the area where the brightness value difference equal to or more than the threshold value or the color parameter difference equal to or more than the threshold value is not detected between the adjacent pixels. According to the above configuration, the determination portion 113 can accurately and efficiently determine whether or not the edge group is the dashed line edge group.

Further, in the present disclosure, the determination portion 113 is configured to perform scanning in the orthogonal direction to the edge extending direction. The scanning length is set to longer than the width of the boundary line image. According to the above configuration, the determination portion 113 can detect the shift between the road surface image and the white line image with high accuracy when scanning the edge group detected from one side of the shorter white line image that constitutes the dashed boundary line or when scanning the edge group detected from the other side of the shorter white line image. Therefore, the determination portion 113 can accurately and efficiently determine the dashed line edge groups.

Also, in the present disclosure, the parking frame setting portion 116 sets the parking frame by using the solid line edges each having the predetermined length and detected by the edge detection portion 111 and the dashed line edges corrected by the correction portion 114. The present disclosure includes the parking frame registration portion 117 that is configured to register the positional information of the parking frame set by the parking frame setting portion 116 and the attributes of the parking frame in the storage portion 120. According to the above configuration, the programs and/or the parking assist device and/or the parking assist method to which the image processor 100 and/or the image processing method are applied can effectively recognize the positional information and the attribute of the parking frame and accordingly the various processes and the parking assist operation can be performed more properly.

The embodiment of the present disclosure has been described in detail with reference to the drawings. However, the above embodiment is only an example of the present disclosure. The embodiment may be modified and/or changed without departing from the spirit of the present disclosure.

In the image processor 100 of the embodiments, the edges are detected based on the magnitude and direction (i.e., positive direction or negative direction) of change in the information on the brightness values and the color parameters (e.g., RGB, RGBA, etc.) in the image signal. However, the edge detection is not limited thereto. The edges may be determined based on the magnitude and direction of change in other information included in the image signal.

What is claimed is:

1. An image processor comprising:
a processor; and
a non-transitory computer-readable medium having stored thereon executable instructions that, when executed by the processor, cause the image processor to function as:
an edge detection portion that is configured to scan in a predetermined direction an image based on an image signal from an imaging device that captures a surrounding around a vehicle and to detect, as edges, an arrangement of pixels in which brightness value difference or color parameter difference between the pixels adjacent to each other is equal to or greater than a threshold value;
a grouping portion that is configured to
extract short edges that may form dashed line edges from the edges detected by the edge detection portion for each of predetermined areas to group the edges,
select a predetermined edge which is a main or reference edge,
compare the predetermined edge with a second edge adjacent to the main or reference edge in the predetermined area to extract an edge that meets a first condition such that lengths of the predetermined and second edges fall within a predetermined range, a second condition such that a distance between an endpoint of the predetermined edge and an endpoint of the second edge falls within a predetermined range; and a third condition such that an angle between the predetermined edge and the second edge is equal to or less than a threshold value, and
group the predetermined edge and the extracted edge into the same group;
a determination portion that is configured to determine that the group of the edges is a group of the dashed line edges when a pattern in which a first area and a second area are detected alternately and repeatedly, wherein the first area is an area where the brightness value difference equal to or more than the threshold value or the color parameter difference equal to or more than the threshold value is detected between the pixels adjacent to each other and the second area is an area where the brightness value difference equal to or more than the threshold value or the color parameter difference equal to or more than the threshold value is not detected between the pixels adjacent to each other;
a correction portion that is configured to perform a linear approximation process on the group of the edges that has been determined as the group of the dashed line edges to connect the short edges to form one dashed line edge, and correct coordinate values of endpoints of the dashed line edge; and
a parking frame setting portion that is configured to set a parking frame by using the dashed line edge whose coordinate values of the endpoint are corrected.

2. The image processor according to claim 1, wherein the grouping portion is further configured to set an extended line relative to the detected edge, and group the detected edge by using a distance between the set extended line and the endpoint of the second edge.

3. The image processor according to claim 1, wherein the determination portion is further configured to scan the area in a direction orthogonal to a direction in which the edge extends.

4. The image processor according to claim 3,
wherein the executable instructions, when executed by the processor, cause the image processor to further function as a parking frame registration portion that is configured to register in a storage portion an attribute of the parking frame and positional information of the parking frame set by the parking frame setting portion.

5. An image processing method comprising:
scanning in a predetermined direction an image based on an image signal from an imaging device that captures a surrounding around a vehicle and detecting, as edges, an arrangement of pixels in which brightness value difference or color parameter difference between the pixels adjacent to each other is equal to or greater than a threshold value;
extracting short edges that may form dashed line edges from the edges detected by the detecting step for each of predetermined areas to group the edges;
selecting a predetermined edge which is a main or reference edge;
comparing the predetermined edge with a second edge adjacent to the main or reference edge in the predetermined area to extract an edge that meets a first condition such that lengths of the predetermined and second edges fall within a predetermined range, a second condition such that a distance between an endpoint of the predetermined edge and an endpoint of the second edge falls within a predetermined range, and a third condition such that an angle between the predetermined edge and the second edge is equal to or less than a threshold value;
grouping the predetermined edge and the extracted edge into the same group;
determining that the group of the edges is a group of the dashed line edges when a pattern in which a first area and a second area are detected alternately and repeatedly, wherein the first area is an area where the brightness value difference equal to or more than the threshold value or the color parameter difference equal to or more than the threshold value is detected between the pixels adjacent to each other and the second area is an area where the brightness value difference equal to or more than the threshold value or the color parameter difference equal to or more than the threshold value is not detected between the pixels adjacent to each other;
performing a linear approximation process on the group of the edges that has been determined as the group of the dashed line edges, connecting the short edges to form one dashed line edge, and correcting coordinate values of endpoints of the dashed line edge; and
setting a parking frame by using the dashed line edge whose coordinate values of the endpoint are corrected.

* * * * *